(12) United States Patent
Gasparini et al.

(10) Patent No.: US 9,587,959 B2
(45) Date of Patent: Mar. 7, 2017

(54) STEP COUNTER DEVICE WITH ENERGY-SCAVENGING FUNCTIONALITY, AND STEP-COUNTING METHOD

(71) Applicant: STMicroelectronics S.r.l., Agrate Brianza (IT)

(72) Inventors: Alessandro Gasparini, Cusano Milanino (IT); Stefano Ramorini, Arluno (IT); Alberto Cattani, Cislago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 605 days.

(21) Appl. No.: 14/034,764

(22) Filed: Sep. 24, 2013

(65) Prior Publication Data

US 2014/0088917 A1    Mar. 27, 2014

(30) Foreign Application Priority Data

Sep. 26, 2012 (IT) .............................. TO2012A0833

(51) Int. Cl.
*H02M 7/219* (2006.01)
*G01C 22/00* (2006.01)
*A43B 3/00* (2006.01)

(52) U.S. Cl.
CPC .......... *G01C 22/006* (2013.01); *A43B 3/0015* (2013.01); *H02M 7/219* (2013.01)

(58) Field of Classification Search
CPC .......................... A43B 3/0015; G01C 22/006
See application file for complete search history.

(56) References Cited

U.S. PATENT DOCUMENTS 4,510,704 A * 4/1985 Johnson .................. A43B 3/00
                                                                    235/105
5,500,635 A * 3/1996 Mott ..................... A43B 1/0072
                                                                    310/311

(Continued)

FOREIGN PATENT DOCUMENTS

EP    2458338 A1 *  5/2012  ........... A61B 5/1036
EP    2458338 A1     5/2012

(Continued)

OTHER PUBLICATIONS

Italian Search Report and Written Opinion for IT TO2012A000833 mailed May 15, 2013 (8 pages).

(Continued)

*Primary Examiner* — Hyun Park
*Assistant Examiner* — Brandon Becker
(74) *Attorney, Agent, or Firm* — Gardere Wynne Sewell LLP

(57) ABSTRACT

A step-counter device detects and counts user steps. The device includes a transducer configured to generate an electrical transduction signal in response to user stepping. An energy-scavenging system is coupled to the transducer to generate a power supply voltage in response to the electrical transduction signal. A processing unit is powered by the power supply voltage. The processing unit is further configured to sense the electrical transduction signal and determine whether a user step has occurred and in response to that determination increment a step counter.

17 Claims, 6 Drawing Sheets

(56) References Cited

U.S. PATENT DOCUMENTS

| | | | |
|---|---|---|---|
| 5,797,201 A * | 8/1998 | Huang | A43B 3/00 36/132 |
| 6,438,193 B1 | 8/2002 | Ko et al. | |
| 7,105,982 B1 * | 9/2006 | Hagood, IV | H02N 2/181 310/319 |
| 7,328,131 B2 | 2/2008 | Donofrio et al. | |
| 7,653,508 B1 * | 1/2010 | Kahn | G01C 22/006 33/700 |
| 8,744,783 B2 | 6/2014 | Templeman | |
| 2006/0237968 A1 | 10/2006 | Chandrasekaran | |
| 2007/0006489 A1 | 1/2007 | Case et al. | |
| 2008/0082025 A1 | 4/2008 | Hughes et al. | |
| 2008/0114565 A1 | 5/2008 | Kato | |
| 2008/0172204 A1 * | 7/2008 | Nagashima | G01C 22/006 702/160 |
| 2009/0127976 A1 * | 5/2009 | Ward | F03G 7/08 310/319 |
| 2010/0090477 A1 | 4/2010 | Keating et al. | |
| 2010/0165686 A1 | 7/2010 | Matzberger et al. | |
| 2011/0119027 A1 | 5/2011 | Zhu et al. | |
| 2012/0307538 A1 | 12/2012 | Ramorini et al. | |
| 2013/0191069 A1 | 7/2013 | Ravindran | |
| 2013/0247424 A1 | 9/2013 | Tseng | |
| 2015/0128733 A1 | 5/2015 | Taylor et al. | |

FOREIGN PATENT DOCUMENTS

| | | |
|---|---|---|
| EP | 2530822 A1 | 12/2012 |
| JP | 2007004577 A | 1/2007 |

OTHER PUBLICATIONS

Shenck N S et al: "Energy Scavenging with Shoe-Mounted Piezoelectrics," IEEE Micro, IEEE Service Cetner, Los Alamitos, CA, US, vol. 21, No. 3, May 1, 2001, pp. 30-42.

Ayaz Hasan et al: "Monolithic DC-DC Boost Converter with Current-Mode Hysteretic Control," Electrical and Computer Engineering (CCECE), 2011 24th Canadian Conference ON, IEEE, May 8, 2011, pp. 1242-1245.

Koichi Ishida et al: "Insole Pedometer with Piezoelectric Energy Harvester and 2V Organic Digital and Analog Circuits," Solid-State Circuits Conference Digest of Technical Papers (ISSCC), 2012 IEEE International, IEEE, Feb. 19, 2012, pp. 308-310.

Fourie D.: "Shoe-Mounted PVDF Piezoelectric Transducer for Energy Harvesting," work conducted during an REU program at Texas A&M University, date unknown, pp. 1-5.

* cited by examiner

STEP COUNTER DEVICE WITH ENERGY-SCAVENGING FUNCTIONALITY, AND STEP-COUNTING METHOD

PRIORITY CLAIM

This application claims priority from Italian Application for Patent No. TO2012A000833 filed Sep. 26, 2012, the disclosure of which is incorporated by reference.

TECHNICAL FIELD

The present invention relates to a step-counter device, a so-called "pedometer", with an energy-scavenging or energy-harvesting functionality, which in this way has a self-supply feature, i.e., the feature of autonomously providing its own supply of electrical energy. The present invention moreover relates to a step-counting method.

BACKGROUND

Step-counter devices are known, which, worn or carried in some other way by a user, enable measurement of the number of steps taken and calculation of the distance covered, in addition to supplying further information, such as for example average speed, or consumption of calories.

Step-counter devices are, for example, used in inertial navigation systems (the so-called "dead reckoning" systems) applied to human beings, which enable tracking of the movements of a user, by identifying and measuring his/her displacement starting from a known starting point, without resorting to the use of a GPS (Global Positioning System) system, or acting as an aid to a GPS system. In these systems, a compass supplies the information related to the direction of displacement, and the step-counter device supplies the information related to the amount of displacement.

Step-counter devices are moreover used in a wide range of applications in the clinical field (for example, in rehabilitation), and in general in the fitness field (as instruments for monitoring the physical activity performed by the user).

In particular, step-counter devices are known that use integrated accelerometers of a microelectromechanical (MEMS) type for step detection.

In particular, these devices are particularly compact, so that they can be conveniently worn by the user, or advantageously integrated within portable electronic apparatuses, such as mobile phones, smartphones, PDAs, tablets, audio digital players, photographic cameras, or video cameras.

The aforesaid step-counter devices implement a step detecting method based on the analysis of the plot of a vertical acceleration that is generated during the various phases of the gait on account of resting of the foot on the ground, and that is detected by the accelerometer fixed with respect to the user body. In particular, execution of a step is determined by identifying acceleration peaks that arise in the acceleration signal, and these peaks are detected by comparing the acceleration signal with a given reference threshold.

Notwithstanding the use of MEMS sensors, with low energy consumption, known step-counter devices require a supply source, typically a battery source, for their use and for the transmission of the information detected to external devices (for example, a portable electronic apparatus, such as a smartphone).

It is also known that systems for energy harvesting from environmental energy sources arouse today considerable interest in a wide range of technology fields, given the increasingly widespread requirement of miniaturization of electronic systems, in particular portable ones, and the corresponding need for supplying these electronic systems with batteries of small dimensions or, where possible, with their own supply sources (so-called "self-supply").

Typically, energy-scavenging systems are designed to collect, store, and transfer energy generated by mechanical sources to a generic electrical load. The mechanical energy is converted by one or more transducers (for example, piezoelectric or electromagnetic transducers) into electrical energy, which can then be used, after appropriate conversion and processing, to supply the electrical load. In this way, the electrical load itself does not require batteries or other additional supply systems. For example, low-frequency vibrations, such as mechanical vibrations of disturbance in systems with moving parts, may constitute a valid energy source.

In particular, systems have been proposed for energy scavenging starting from human walking, by means of appropriate energy-scavenging systems housed inside, or coupled to, the shoes of a user.

In this regard, the following documents (incorporated herein by reference) may, for example, be cited:

"Shoe-mounted PVDF Piezoelectric Transducer for Energy Harvesting", D. Fourie, MIT Undergraduate Research Journal 19, pp. 66-70, Spring 2010; or "Energy Scavenging with Shoe-Mounted Piezoelectrics", N. S. Shenck, J. A. Paradiso, Micro, IEEE, vol. 21, No. 3, pp. 30-42, May/June 2001.

These systems envisage, by means of piezoelectric transducers, recovery of part of the mechanical energy dissipated when the foot rests on the ground during walking. The energy recovered may for example be used for supplying portable electronic devices, or for activating wireless transmission of information.

As illustrated in general in FIG. 1, an energy-scavenging system of a known type, designated by 1, comprises: a transducer 2, for example of a piezoelectric type, subjected during use to vibrations or other environmental mechanical stresses and configured for converting mechanical energy into electrical energy, typically into AC signals; a scavenger interface 4, for example comprising a diode-bridge rectifier circuit, configured for receiving at its input the AC signals generated by the transducer 2 and supplying at its output a DC signal for charging a capacitor 5 connected to the output of the rectifier circuit; and a voltage converter or regulator 6, for example a DC/DC converter, connected to the capacitor 5 for receiving at its input the electrical energy stored by the same capacitor 5 and supplying it to an electrical load 8. The capacitor 5 has hence the functionality of energy-storage element, to store energy, which is made available, when required, to the electrical load 8 for its operation.

The energy efficiency of the energy-scavenging system 1 is evaluated as a function of the ratio between the power supplied at input by the transducer 2 (designated by $P_{TRANSD}$), and the power supplied at output by the scavenger interface 4 (designated by $P_{SCAV}$) or the power available on the load (designated by $P_{LOAD}$).

In general, the need is certainly felt to further improve step-counter devices of a known type, in particular as regards the corresponding electrical supply and the corresponding energy efficiency.

SUMMARY

In an embodiment, a step-counter device with energy-scavenging functionality, and a step-counting method are consequently provided.

In an embodiment, a step-counter device comprises: a transducer configured to generate an electrical transduction signal as a function of mechanical activity generated during stepping; a processing unit configured to determine a step based on said electrical transduction signal and consequently increment a step count; an energy-scavenging system coupled to said transducer and configured to generate electrical energy for supplying said processing unit from said electrical transduction signal generated as a function of the mechanical activity generated during stepping.

In an embodiment, a method comprises: carrying out an operation of transduction for generating an electrical transduction signal as a function of mechanical activity generated during stepping; and determining from analysis of said electrical transduction signal that a step has occurred and enabling an incrementing of a step count; wherein carrying out an operation of transduction comprises carrying out an operation of energy scavenging starting from said mechanical activity generated during stepping for the generation of electrical energy on the basis of said electrical transduction signal.

In an embodiment, a device comprises: a motion transducer configured to generate an electrical transduction signal in response to applied motion; an energy scavenging device configured to convert said electrical transduction signal into a power supply voltage; and a processing device powered from said power supply voltage and having a sensor input coupled to receive the electrical transduction signal, said processing device configured to analyze the electrical transduction signal for the purpose of detecting a certain type of applied motion.

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION OF THE DRAWINGS

As will be clarified in detail hereinafter, one aspect envisages implementing, in a step-counter device, an energy-scavenging system, comprising a transducer of mechanical energy into electrical energy, in particular of an electromagnetic type, and use of this transducer as an element for detecting the step of the user, based on which counting of the steps is performed. The step-counter device is hence extremely compact and efficient from the energy standpoint, given its self-supplying capacity.

Figure 1:
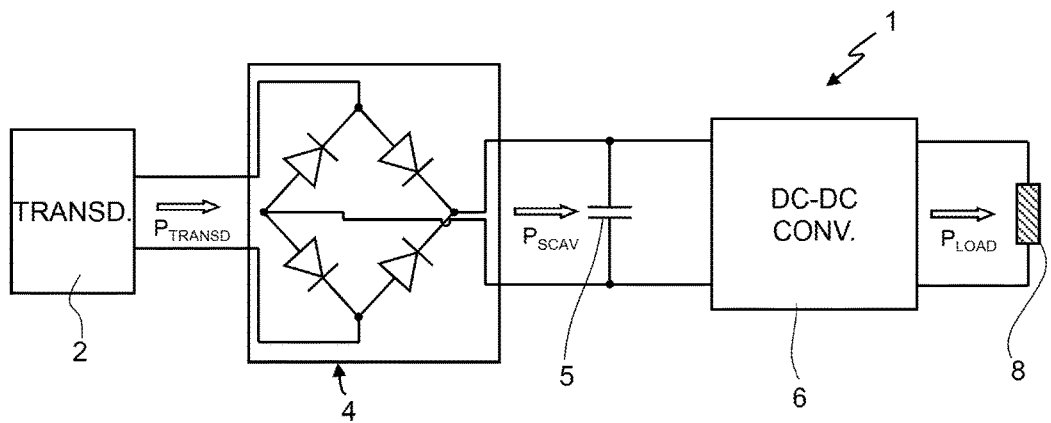
FIG. 1 shows a block diagram of an energy-scavenging system, of a known type.
Figure 2:
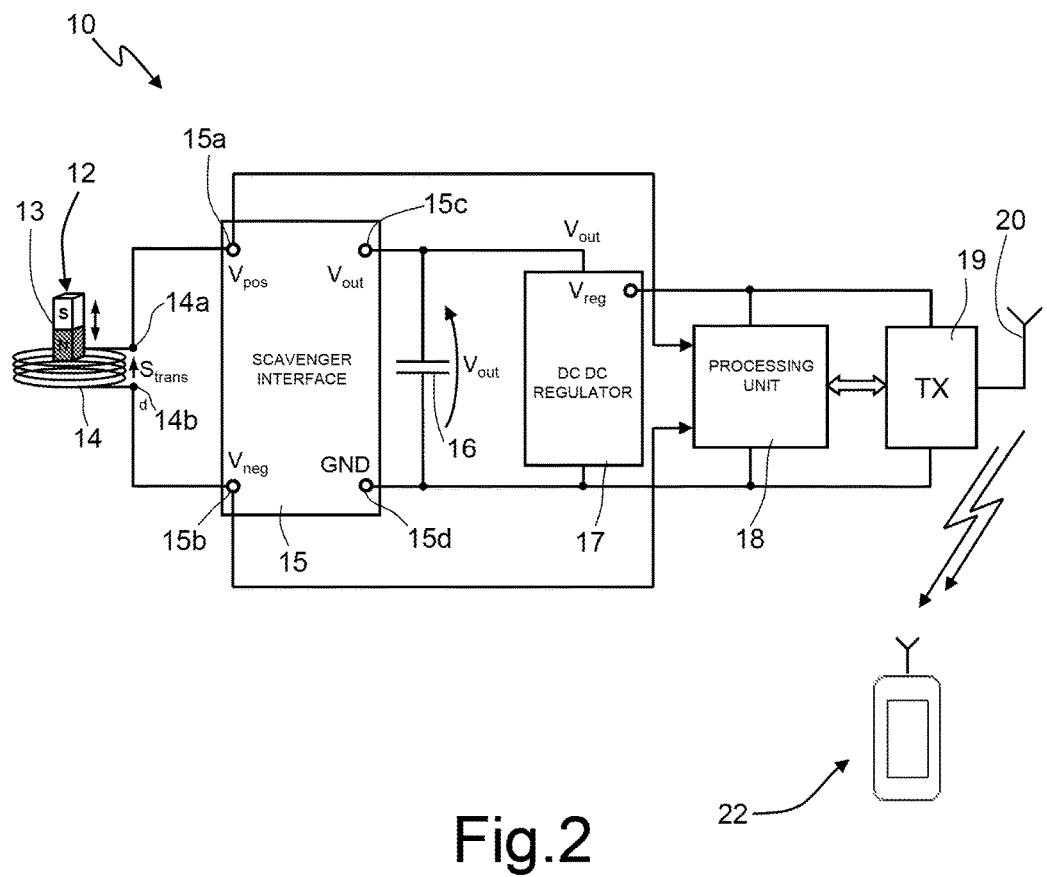
FIG. 2 shows a block diagram of a step-counter device with an energy-scavenging system.

With reference to FIG. 2, a step-counter device, designated as a whole by 10, includes a transducer 12, for example of an electromagnetic type, shown schematically and constituted, in a way in itself known, by a body 13, with permanent magnetization, configured to move within a coil 14, in response to mechanical stresses coming from the external environment, thus causing generation of a transduction signal $S_{transdr}$, in particular a voltage, between output terminals 14a, 14b of the coil 14. In particular, the transducer 12 is designed to be coupled to a shoe of a user in such a way as to be subjected to mechanical stresses as a consequence of the steps performed by the user and of the impact of the foot on the ground.

The step-counter device 10 further comprises a scavenger interface stage 15, and a storage capacitor element 16.

The scavenger interface stage 15 has a first input terminal 15a and a second input terminal 15b, electrically coupled to a respective output terminal 14a, 14b of the transducer 12 so as to receive the transduction signal $S_{transd}$, and a first output terminal 15c and a second output terminal 15d, connected between which is the storage capacitor 16 and present between which is an output voltage $V_{out}$.

The step-counter device 10 further comprises: a voltage-regulator stage 17, for example including a DC/DC voltage converter, which receives at its input the output voltage $V_{out}$, and supplies at its output a regulated voltage $V_{reg}$, for example of 1.8 V; a processing unit 18, for example a microprocessor or microcontroller processing unit (or similar computing tool); and a transmission stage 19, coupled to a transmission antenna 20.

The processing unit 18 is supplied by the regulated voltage $V_{reg}$ and is moreover connected to the first and second input terminals 15a, 15b of the interface stage 15. As will be described in detail hereinafter, the processing unit 18 is configured to implement an appropriate algorithm for detecting the execution of a step as a function of the characteristics of the transduction signal $S_{transd}$ generated by the transducer 12, so as to perform the function of counting the user's steps.

The processing unit 18 is moreover configured for actuating the transmission stage 19, and the corresponding transmission antenna 20, for remote wireless transmission of the information processed regarding counting of the steps of the user, for example with Bluetooth (BT), or infrared (IR), or Wifi, or NFC transmission technology, or the like.

As shown schematically, these information may be sent to a portable electronic apparatus 22, such as, for example, a smartphone, a tablet, a digital audio player, or a camera, for their display by the user and/or execution of further processing and activation of functions within the same portable electronic apparatus 22.

The step-counter device 10 may comprise a single housing, designed to house all the elementary components described previously and designed to be coupled in an appropriate manner to the shoe of the user, for example by being placed inside the same shoe, embedded in the sole; alternatively, the step-counter device 10 may comprise distinct housings, for example for the transducer 12 and for the remaining electronic circuitry associated thereto.

The scavenger interface stage 15 is in general configured for converting the transduction signal $S_{transd}$, generated by the transducer 12 due to the transduction action of the mechanical energy associated to the step, into a form useful for energy scavenging and subsequent generation of the regulated voltage $V_{reg}$ by the voltage-regulator stage 17, with the aim of maximizing the efficiency of conversion and in general of the energy scavenging action.

For instance, the scavenger interface stage 15 may be made as described in patent application No. TO2011A000474, filed in the name of the present applicant, on May 30, 2011 (the disclosure of which is incorporated by reference).

Figure 3:
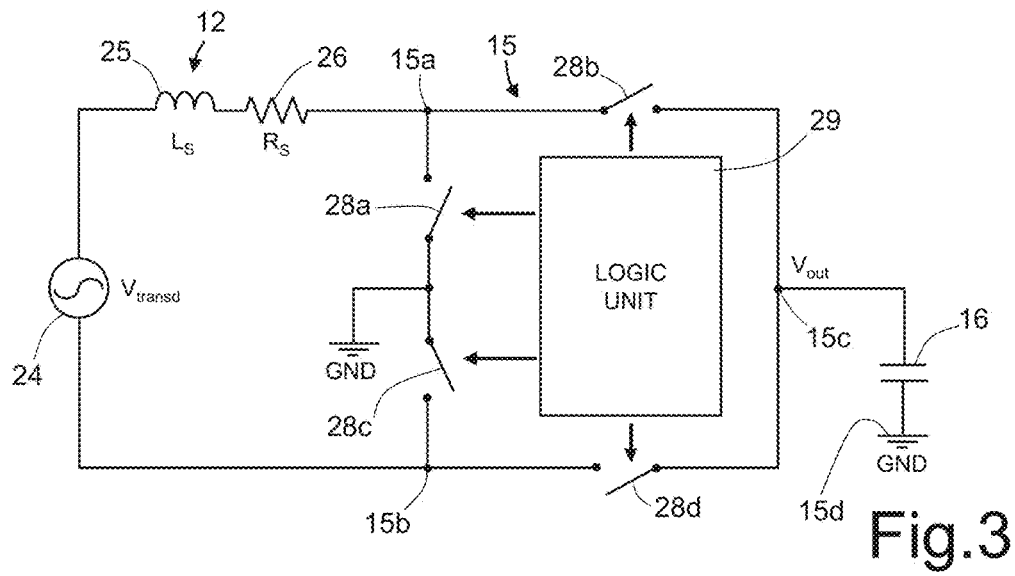
FIG. 3 shows a circuit diagram of an energy-scavenger interface stage in the step-counter device of FIG. 2.

As shown in FIG. 3, the scavenger interface stage 15 provides in this case a switching converter of a fully active boost type, which exploits directly the intrinsic inductance of the transducer 12, which may indeed be modeled as a voltage generator 24, designed to supply a voltage $V_{transd}$ (corresponding to the transduction signal $S_{transd}$) and series-connected to an inductor 25, having characteristic inductance L, and to a resistor 26, having characteristic resistance $R_s$.

The scavenger interface stage 15 comprises two pairs of switches, functionally coupled together, and a logic control unit, designed to control switching of the switches for cyclically managing storage of energy in the inductor 25 and its transfer to the storage capacitor 16, at both polarities, positive and negative, of the voltage $V_{transd}$. The switches are provided as active elements, by means of high-voltage transistors, for example, N-channel MOSFETs.

In detail, a first pair of switches includes a first switch 28a, connected between the first input terminal 15a and a reference terminal GND (for example, connected to the electric ground of the circuit); and a second switch 28b, connected between the same first input terminal 15a and the first output terminal 15c and to the storage capacitor 16 (the second output terminal 15d is connected to ground).

The second pair of switches includes: a third switch 28c, connected between the second input terminal 15b and the reference terminal GND; and a fourth switch 28d, connected between the same second input terminal 15b and the first output terminal 15c and to the storage capacitor 16.

Each switch 28a-28d has a respective control terminal receiving a respective control signal from the logic control unit, here designated by 29.

In case of positive polarity of the voltage $V_{transd}$, the logic control unit 29 keeps the third switch 28c closed and the fourth switch 28d open so as to operate in switching the first pair of switches 28a, 28b, cyclically storing energy in the inductor 25 by closing the first switch 28a (with the second switch 28b being open), and causing subsequent transfer of the same energy to the storage capacitor 16 by closing the second switch 28b (and opening the first switch 28a).

Operation is altogether symmetrical and specular as regards the negative polarity of the voltage $V_{transd}$, with the logic control unit 29 that keeps the first switch 28a closed and the second switch 28b open, and operates in switching the second pair of switches 28c, 28d for cyclically storing energy in the inductor 25 by closing the third switch 28c, and causing subsequent transfer of energy to the storage capacitor 16 by closing the fourth switch 28d.

The switching timing of the switches 28a-28d is managed by the logic control unit 29 in such a way as to maximize the coupling efficiency between the transducer 12 and the scavenger interface stage 15, and hence the efficiency of energy transfer to the storage capacitor 16.

Figure 4A:
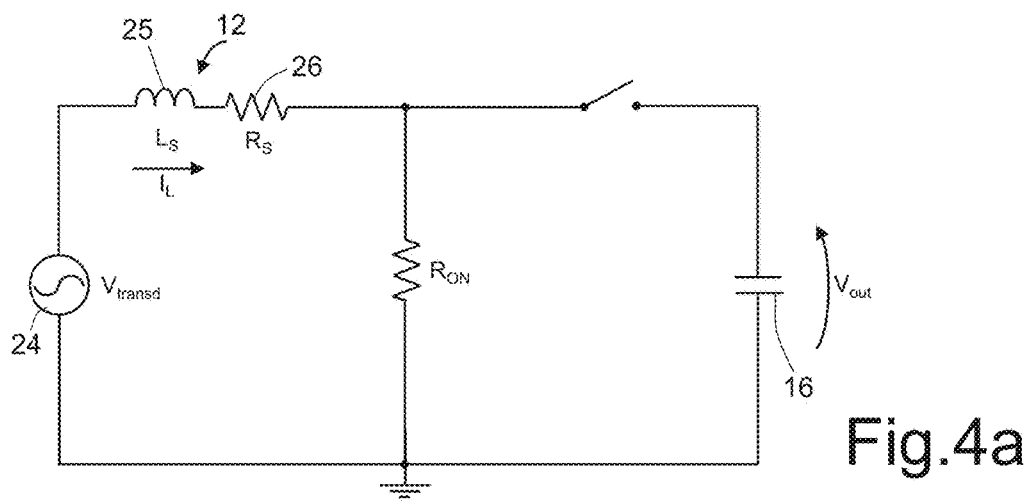
FIGS. 4a and 4b are circuit models of the interface stage of FIG. 3, in respective operating conditions.
Figure 4B:
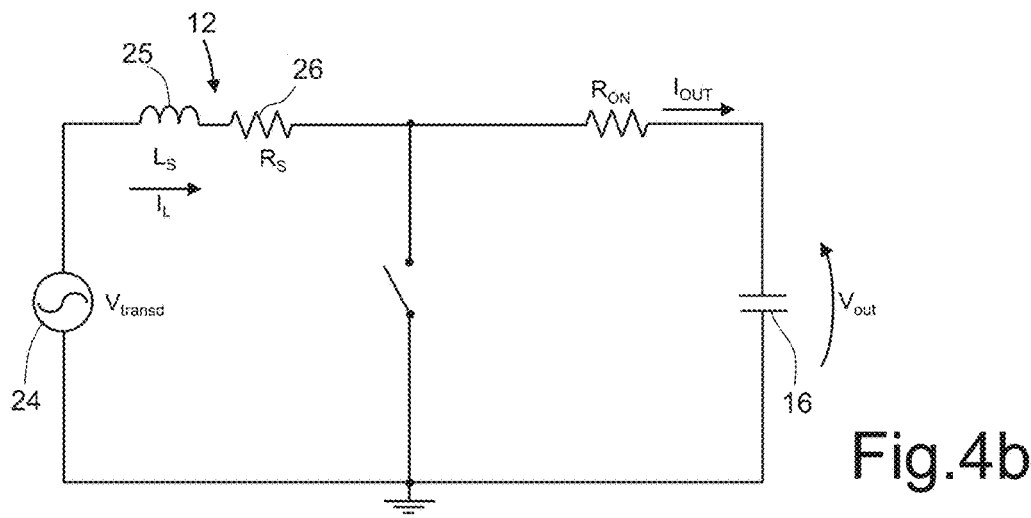

In order to explain the control algorithm executed by the logic control unit 29, reference may be made, given the symmetry of the circuit, to the circuit model of one half of the circuit, shown in FIGS. 4a and 4b, respectively in the case of the operating condition of storage of energy in the inductor 25, and of the operating condition of transfer of the energy stored to the storage capacitor 16 (in this model, $R_{ON}$ is the closed-state resistance of the first switch 28a or of the second switch 28b each time driven in a closing state).

Figure 5A:
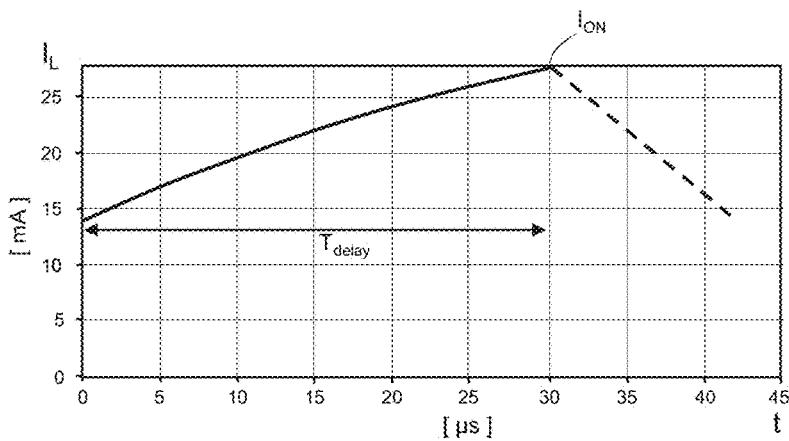
FIGS. 5a and 5b show plots of an electric current in the interface stage of FIG. 3, referred to the circuit models of FIGS. 4a and 4b, respectively.

In particular, with reference also to FIG. 5a, regarding the operating condition of FIG. 4a, during storage of energy in the inductor 25, the current circulating in the inductor, designated by $I_L$, increases up to a peak value $I_{ON}$, after a time interval $T_{delay}$ has elapsed starting from the start of the storage operating condition. The logic control unit 29 indeed controls, via control of the switches, the end of the storage operating condition after the time interval $T_{delay}$ has elapsed and moreover a minimum threshold value $I_{th}$ has been exceeded by the current in the inductor $I_L$.

The threshold value $I_{th}$ is chosen much lower than the peak value $I_{ON}$ that is expected to be reached in the application in which the circuit is used. For example, assuming that peak values $I_{ON}$ are reached of approximately 150 mA, the threshold value $I_{th}$ may be chosen as comprised between approximately 5 and 10 mA (given that the choice of a threshold value $I_{th}$ too close to the peak value $I_{ON}$ entails a low efficiency).

Figure 5B:
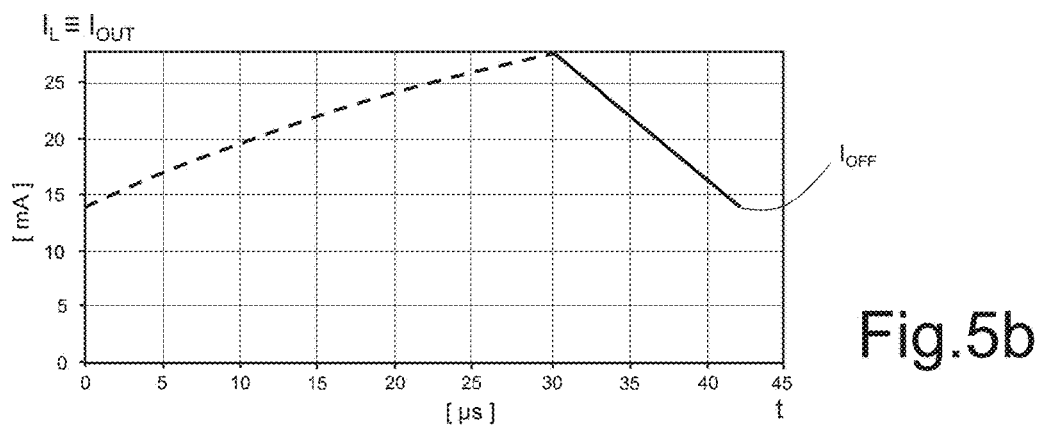

Next, as shown in FIG. 5b, in the operating condition of transfer of energy, the current in the inductor $I_L$, which coincides with the current, designated by $I_{OUT}$, which flows in the storage capacitor 16, decreases to a lower-limit value $I_{OFF}$, where the logic control unit 29 controls a new switching of the switches, to return, cyclically, into the operating condition of storage of energy in the inductor 25.

In particular, the aforesaid lower-limit value $I_{OFF}$ is equal to a fraction k (with k>1) of the peak value $I_{ON}$:

$$I_{OFF}=I_{ON}/k$$

As explained in detail in the aforesaid patent application No. TO2011A000474, the logic control unit 29, by the choice of the time interval $T_{delay}$ and of the factor k, is able to act on the mean value and on the ripple of the current in the inductor $I_L$.

Figure 6:
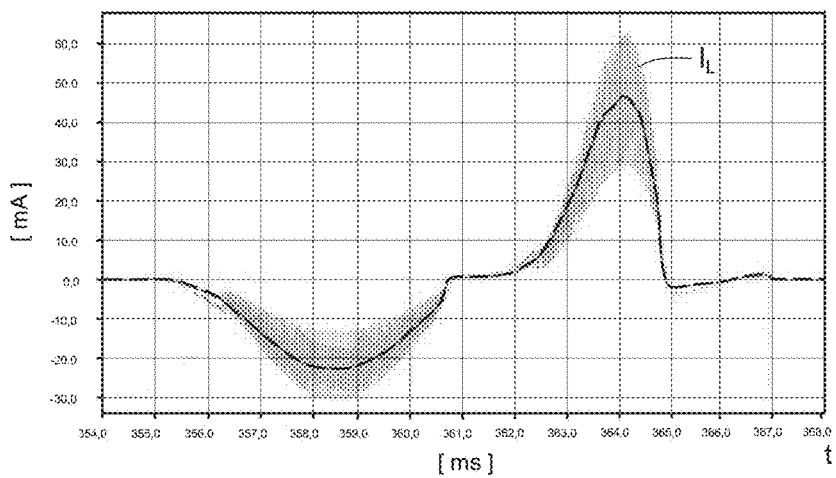
FIG. 6 shows the graph of an electrical output quantity in the interface stage of FIG. 3.

In particular, the logic control unit 29 determines optimal values of the time interval $T_{delay}$ and of the factor k such as to minimize the ripple in the plot of the current in the inductor $I_L$, represented in FIG. 6 with a solid line, and maximize the matching between the current in the inductor $I_L$ and the current present on a matched load (represented with a dashed line in the same FIG. 6).

The logic control unit 29 in this way ensures the best matching ($\eta \approx 1$) between the transducer 12 and the scavenger interface stage 15 (that is, the output of the transducer 12 and the input of the scavenger interface stage 15 have substantially the same impedance), maximizing the efficiency of power transfer between input and output of the scavenger interface stage 15, in each cycle of charge/discharge of the inductor 25.

As pointed out previously, the processing unit 18 of the step-counter device 10, with the appropriate electrical supply thanks to the action of the scavenger interface stage 15 starting from the transduction signal $S_{transd}$, is able to detect the execution of a step as a function of the characteristics of the same transduction signal $S_{transd}$.

Figure 7:
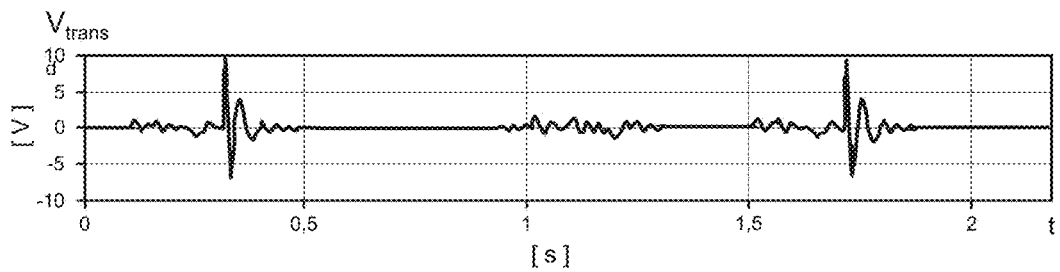
FIG. 7 shows the trend of an electrical transduction signal generated by a transducer of the step-counter device of FIG. 2.

It is noted that the transduction signal $S_{transd}$ generated by the transducer 12, whose voltage plot is shown in FIG. 7, has a characteristic pattern at each step executed by the user.

In particular, this pattern envisages the occurrence of a significant activity (in terms of amplitude and/or duration of the signal) both in the positive portion of the signal and in the negative portion of the signal within a given time interval of analysis, as a result of the initial impact of the foot on the ground and of the subsequent displacement of the weight of the body onto the other foot. For example, this pattern envisages the presence of a first positive peak followed by a negative peak substantially of the same amplitude and by a second positive peak of lower amplitude, in turn followed by a subsequent rebound and settling phase (within the time interval of analysis).

The processing unit 18 hence executes an appropriate algorithm (by execution of appropriate software instructions) for recognizing occurrence of this pattern in the transduction signal $S_{transd}$, and consequently for detecting execution of a step by the user.

A more detailed description of a possible implementation of the aforesaid algorithm is now presented, which envisages, for example, monitoring, by the processing unit 18, of the signals having positive polarity and, respectively, negative polarity (consequently designated by $V_{pos}$ and $V_{neg}$) present, respectively, on the first input terminal 15a and on the second input terminal 15b of the scavenger interface stage 15 (or, likewise on the output terminals 14a, 14b of the transducer 12).

Given the switching operation of the scavenger interface stage 15, these signals have a so-called chopped pattern; i.e., they are constituted by a plurality of pulses of short duration, which is a function of the duty cycle of the switching operation, the pulses having an amplitude that is, in general, a function of the value of the output voltage $V_{out}$ accumulated on the storage capacitor 16.

In particular, the value of the positive signal $V_{pos}$ is substantially zero, during the operating condition of storage of energy in the inductor 25 (i.e., during a first portion of the switching period), and becomes almost instantaneously substantially equal to the output voltage $V_{out}$ on the storage capacitor 16 during the subsequent operating condition of transfer of energy into the same storage capacitor 16 (i.e., during the second portion of the switching period). Similar considerations apply to the negative signal $V_{neg}$.

The envelope of the positive and negative signals $V_{pos}$, $V_{neg}$ hence follows the plot of the output voltage $V_{out}$ on the storage capacitor 16. Moreover, the positive and negative signals $V_{pos}$, $V_{neg}$ are substantially zero when the transduction signal $S_{transd}$ is also substantially zero, given that the current in the inductor $I_L$ does not reach the threshold value $I_{th}$ and the switching operation is interrupted.

Figure 8A:
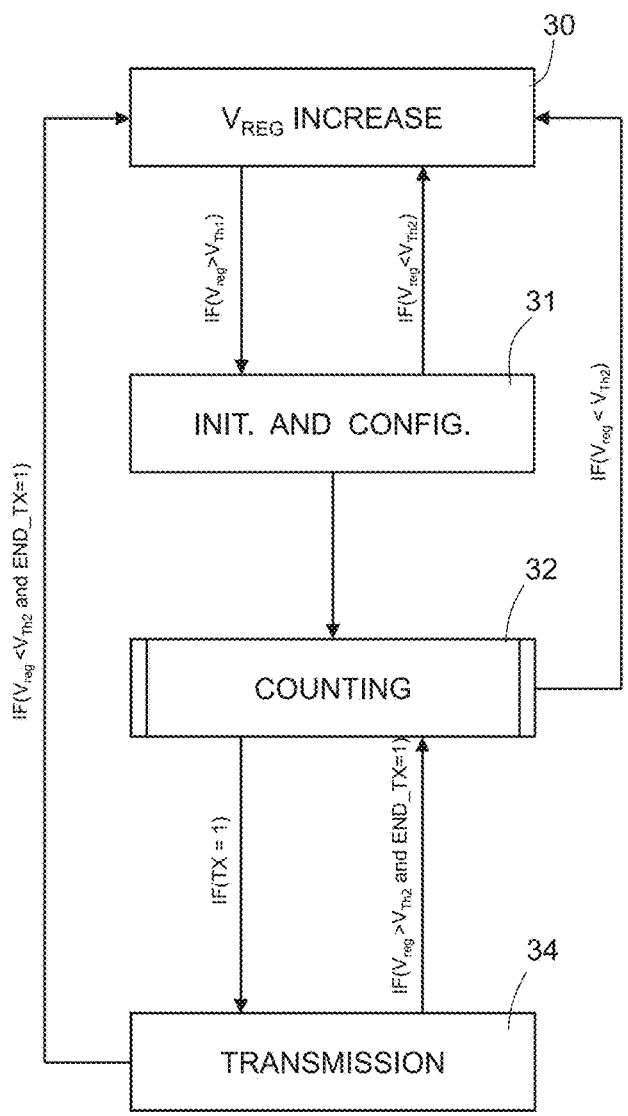
FIGS. 8a and 8b are flowcharts regarding a step-detection algorithm executed by a processing unit of the step-counter device of FIG. 2.

With reference to FIG. 8a, the algorithm envisages first, phase 30, monitoring of the level of the regulated voltage $V_{reg}$, in order to verify whether it is sufficient for the operations of step detection, i.e., it is greater than a given upper threshold value $V_{th1}$; for example, a check is made to verify that the regulated voltage $V_{reg}$ is higher than 1.8 V.

In this case, from phase 30 control moves to phase 31, where operations of initialization and configuration of the microcontroller (or microprocessor, or similar computing tool) are performed in the processing unit 18. Also in this phase 32 a check is made on the value of the regulated voltage $V_{reg}$, and control once again moves to phase 30 as soon as this value is lower than a given lower threshold value $V_{th2}$, for example equal to 1.5 V.

Figure 8B:
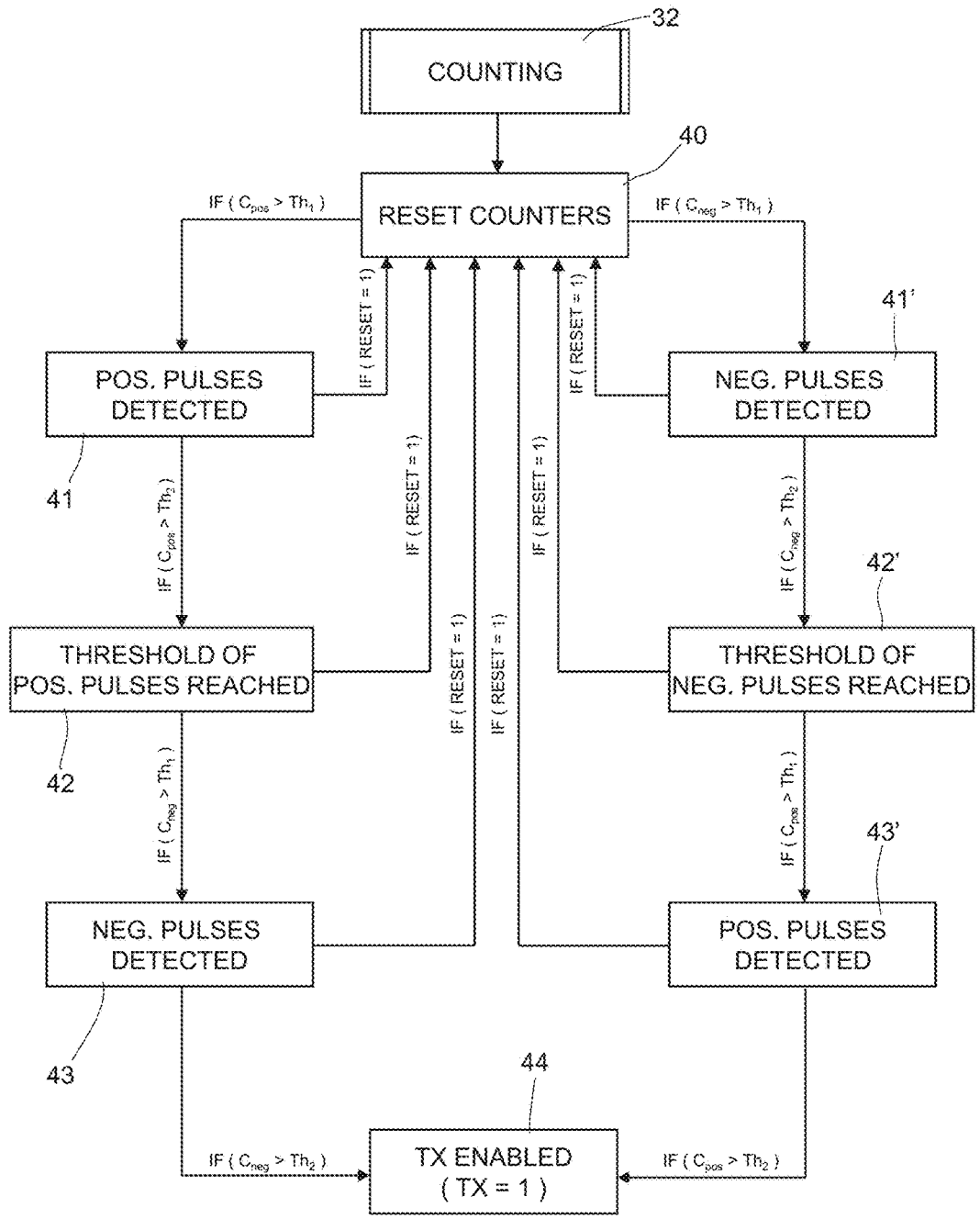

At the end of the configuration operations, in a phase 32, the processing unit 18 carries out step detection and counting (operations represented in detail in the next FIG. 8b). Once again, in the case where it is verified that the regulated voltage $V_{reg}$ drops below the lower threshold value $V_{th2}$, from phase 32 control returns to phase 30, to wait for a sufficient increase in the regulated voltage $V_{reg}$, as a result of harvesting of mechanical energy and its conversion into electrical energy.

At the end of the counting phase (for example, as represented in detail hereinafter, following upon determination of execution of a step), a transmission operation is enabled (phase 34) where count increment information are sent to the portable apparatus 22 via the transmission stage 19 (condition 'TX=1').

At the end of the transmission phase (condition 'END_TX=1'), in the case where the value of the regulated voltage $V_{reg}$ is sufficient (in this case higher than the lower threshold value $V_{th2}$), control returns to the counting phase 32, for detection of a new execution of the step; otherwise, in the case where the value of the regulated voltage $V_{reg}$ is lower than the lower threshold value $V_{th2}$, control passes to phase 30, for a sufficient increase in the regulated voltage $V_{reg}$.

As illustrated in FIG. 8b, the counting operations carried out in phase 32 envisage a first operation of initialization (phase 40) wherein the counters that will be used for step detection are reset (i.e., set to zero), in particular: a positive counter $C_{pos}$, indicating the switching activity of the positive signal $V_{pos}$, i.e., the number of positive chopped pulses detected; and a negative counter $C_{neg}$, indicating the switching activity of the negative signal $V_{neg}$, i.e., the number of negative chopped pulses detected.

At phase 40, the positive and negative signals $V_{pos}$ and $V_{neg}$ are moreover monitored, to verify the occurrence of the corresponding pulses, defined accordingly as positive (if they regard the positive signal $V_{pos}$) or negative (if they regard the negative signal $V_{neg}$); at each positive or negative pulse detected, the corresponding positive counter $C_{pos}$ or negative counter $C_{neg}$ is incremented.

In the case where a number of positive pulses is detected higher than a first counting threshold value $Th_1$, i.e., in the case where the presence of a significant number of positive pulses is found, the algorithm proceeds to phase 41, where the possible presence of sufficient activity in the positive portion of the transduction signal $V_{transd}$, i.e., of an activity potentially indicating execution of a step, is determined.

In particular, in phase 41 the positive counter $C_{pos}$ is further incremented at each occurrence of a positive pulse; however, if starting from the end of a detected positive pulse a time interval longer than a first time threshold $T_{chop}$ elapses without there being detected a subsequent positive pulse (condition 'reset=1'), the algorithm returns to phase 40, wherein the counters are again reset in so far as it is deemed that the detected pulses do not indicate execution of a step.

In the case where the positive counter $C_{pos}$ reaches, instead, a second counting threshold value $Th_2$ (with $Th_2 > Th_1$), the algorithm determines the presence of sufficient activity in the positive portion of the transduction signal $V_{transd}$ and proceeds to evaluation, phase 42, of the possible presence of sufficient activity in the negative portion of the same transduction signal $V_{transd}$, i.e., of an activity indicating execution of a step.

In particular, if the negative counter $C_{neg}$ (which meanwhile has been incremented upon occurrence of each negative pulse) exceeds the first counting threshold value $Th_1$, i.e., in the case where the presence of a significant number of negative pulses is verified, the algorithm proceeds to next phase 43.

During the aforesaid phase 42, if an interval longer than a second time threshold $T_p$ has elapsed, with $T_p > T_{chop}$ (condition 'reset=1'), without any pulses on $V_{pos}$ or $V_{neg}$ having occurred, the algorithm again returns to phase 40, where the counters are reset in so far as is deemed that the pulses detected do not indicate execution of a step.

In the aforesaid phase 43, the negative counter $C_{neg}$ is further incremented, upon each occurrence of a negative pulse; however, if starting from the end of a detected negative pulse a time interval longer than the first time threshold $T_{chop}$ elapses without a subsequent negative pulse being detected (condition 'RESET=1'), then the algorithm returns again to phase 40.

If the negative counter $C_{neg}$ exceeds, instead, the second counting threshold value $Th_2$, the algorithm determines also the presence of sufficient activity in the negative portion of the transduction signal $V_{transd}$ and thus verifies execution of a step.

The algorithm hence proceeds to phase 44, for enabling the transmission of the information of step count increment, by the transmission stage 19 (condition 'TX=1').

It is to be noted that in the initial phase 40, the algorithm envisages that, even in the case where a number of negative pulses higher than the first counting threshold value $Th_1$ is detected, verification of execution of the step is performed.

In this case, the algorithm proceeds with the phases 41', 42', 43' altogether similar to the phases 41, 42, 43 described previously (with the obvious inversion of the portion, negative or positive, each time considered, of the transduction signal $V_{transd}$), until phase 44 is once again reached, in which transmission of the information of count increment is enabled, in the case where execution of the step is determined.

Figure 9:
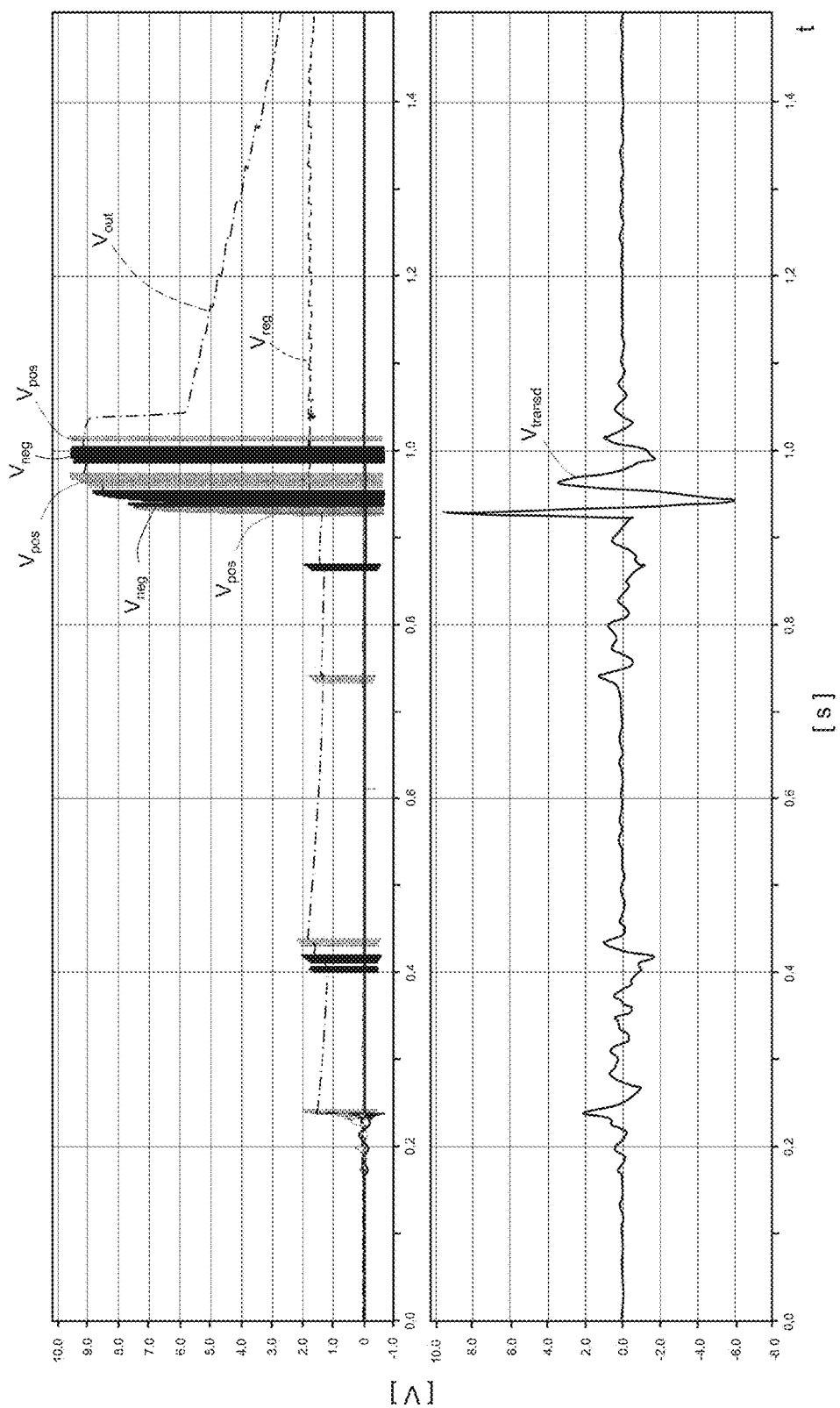
FIG. 9 shows the evolution of electrical quantities in the step-counter device of FIG. 2.

By way of example, FIG. 9 shows possible plots of the positive and negative signals $V_{pos}$, $V_{neg}$ relating to the transduction signal $S_{transd}$, of the output voltage $V_{out}$ and of the regulated voltage $V_{reg}$, referred to the plot of the transduction voltage $V_{transd}$. In particular, execution of a step may be noted, as well as the associated pattern of the positive and negative signals $V_{pos}$, $V_{neg}$; it may also be noted how the regulated voltage $V_{reg}$ is stable at a value sufficient to enable the operations of step detection by the processing unit 18.

The advantages of the step-counter device and of the corresponding step-counting method are clear from the foregoing description.

In general, it is once again underlined that the step-counter device has a self-supplying capacity, thanks to the presence of the efficient energy-scavenging system, which supplies sufficient energy for step detection and for transmission of the step-counting information to the outside environment (for example, to a portable electronic apparatus via Bluetooth wireless transmission).

In particular, the number of components required is reduced to a minimum, thanks to the absence of a battery or of other electrical supply sources, and to the fact that one and the same transducer is used both for the operations of scavenging of energy resulting from the step, and for detection of the step itself, and consequent counting of the user's steps.

For detection of the step, no additional sensors are hence required, such as for example an accelerometer sensor.

Consequently, the energy required for operation of the step-counter device is reduced to a minimum.

Moreover, advantageously, the solution described enables detection of execution of steps both when the user is running and when the user is walking. The essential difference between walking and running is in fact the amount of energy that is generated, in the former case much lower than in the latter; the system proposed, which is very simple in terms of components, thanks to the high efficiency, is able to operate even with the low energy produced during walking.

Finally, it is clear that modifications and variations may be made to what has been described and illustrated herein, without thereby departing from the scope of the present invention, as defined in the annexed claims.

In particular, the solution described may be used also with different types of transducers, for example of a piezoelectric type, using in any case one and the same transducer both for the energy scavenging and for the step detection (possibly with appropriate modifications envisaged in the algorithm executed by the processing unit 18).

The scavenger interface stage 15 may differ from the one illustrated; for example, it may have a different circuit configuration, which is able in any case to ensure generation of the regulated voltage $V_{reg}$ for operation of the processing unit and execution of the step-detection operations. In particular, the solution described may require, for this purpose, generation of signals $V_{pos}$ and $V_{neg}$ having characteristics similar to digital signals, as a function of the step, so that they may be analyzed and interpreted by the processing unit 18, appropriately supplied by the aforesaid regulated voltage $V_{reg}$.

Moreover, the transmission of the counting information may be enabled by the processing unit 18 at pre-set time intervals, instead of at each step detected.

What is claimed is:

1. A step-counter device, comprising:
   a transducer configured to generate an electrical transduction signal as a function of mechanical activity generated during stepping, said electrical transduction signal having a waveform pattern characteristic of a step that comprises, within a given time interval, a first waveform portion immediately followed by a second waveform portion, the first and second waveform portions being of opposite polarity;
   a processing unit configured to determine a step based on said electrical transduction signal and consequently increment a step count; and
   an energy-scavenging system coupled to said transducer and configured to generate electrical energy for supplying said processing unit from said electrical transduction signal generated as a function of the mechanical activity generated during stepping, wherein a switching operation of said energy-scavenging system causes a plurality of pulses within each of the first waveform portion and the second waveform portion; and
   wherein the processing unit is configured to count the plurality of pulses within each of the first and second waveform portions and determine that said step has occurred if a number of counted pulses within the first waveform portion exceeds a first threshold and a number of counted pulses within the second waveform portion exceeds a second threshold.

2. The device according to claim 1, wherein the first and second thresholds are a same threshold.

3. The device according to claim 1, wherein the processing unit completes counting of pulses within each of the first and second waveform portions only if an initial count of said pulses within each of the first and second waveform portions exceeds a minimum threshold.

4. The device according to claim 1, wherein said transducer is of an electromagnetic type and has a characteristic inductance.

5. The device according to claim 4, wherein said energy-scavenging system comprises an interface stage having a first input terminal and a second input terminal coupled to said transducer and configured for operation as a switching converter at a switching duty cycle and using the characteristic inductance of said transducer, said pulses within each of the first and second waveform portions having a duration that is a function of said switching duty cycle.

6. The device according to claim 5, wherein said processing unit includes sensing inputs connected to said first input terminal and said second input terminal of said interface stage, the processing unit configured to process a first signal and a second signal present on said first input terminal and second input terminal, respectively, to determine execution of a step.

7. The device according to claim 6, wherein said energy-scavenging system comprises a storage capacitor on which an output voltage is present, said storage capacitor connected between a first output terminal and a second output terminal of said interface stage; and wherein said first input terminal and said second input terminal are selectively switched, by said processing unit, in connection to a reference voltage or to said output voltage.

8. The device according to claim 5, wherein said energy-scavenging system comprises a storage capacitor on which an output voltage is present, said storage capacitor connected between a first output terminal and a second output terminal of said interface stage; and wherein said interface stage comprises a logic control unit and a set of switches designed to be controlled in switching by said logic control unit for cyclically causing storage of energy in said inductor in a first interval of a switching period, and transfer of energy onto said storage capacitor in a second interval of the switching period, at both polarities, positive and negative, of the electrical transduction signal.

9. The device according to claim 8, wherein said logic control unit is configured for controlling switching of said set of switches to optimize a coupling efficiency between said transducer and said interface stage.

10. The device according to claim 9, wherein said first interval has a duration Tdelay and wherein a ratio k is present between the value of the current circulating in said inductor at the end of said first interval and the value of the current circulating in said inductor at the end of said second interval; wherein said logic control unit is configured to set the values of said duration Tdelay and of said ratio k to optimize said coupling efficiency.

11. The device according to claim 1, wherein said energy-scavenging system comprises a voltage-regulator stage configured to generate a regulated voltage for supplying said processing unit; and wherein said processing unit is configured to monitor the value of said regulated voltage and to enable operation to determine that said step has occurred only in the case where said regulated voltage has a value higher than a voltage threshold.

12. The device according to claim 1, further comprising a transmission stage operable in response to said processing unit for making a wireless transmission of information associated to said count.

13. The device according to claim 1, having a housing designed to be coupled to a shoe of said user.

14. A method, comprising:
carrying out an operation of transduction for generating an electrical transduction signal as a function of mechanical activity generated during stepping, said electrical transduction signal having a waveform pattern characteristic of a step that comprises, within a given time interval, a first waveform portion immediately followed by a second waveform portion, the first and second waveform portions being of opposite polarity; and
determining from analysis of said electrical transduction signal that a step has occurred and enabling an incrementing of a step count;
wherein carrying out the operation of transduction comprises carrying out an operation of energy scavenging starting from said mechanical activity generated during stepping for the generation of electrical energy on the basis of said electrical transduction signal, a switching operation performed during energy-scavenging causing a plurality of pulses within each of the first waveform portion and the second waveform portion; and
wherein determining comprises counting the pulses within each of the first and second waveform portions and determining that said step has occurred if a number of counted pulses within the first waveform portion exceeds a first threshold and a number of counted pulses within the second waveform portion exceeds a second threshold.

15. The method according to claim 14, wherein determining comprises detecting execution of a step upon occurrence of a characteristic pattern in the plot of said electrical transduction signal.

16. A device, comprising:
a motion transducer configured to generate an electrical transduction signal in response to applied motion, said electrical transduction signal having a waveform pattern characteristic of a step that comprises, within a given time interval, a first polarity waveform portion immediately followed by a second polarity waveform portion, the first and second polarities being opposite of each other;
an energy scavenging device configured to convert said electrical transduction signal into a power supply voltage, wherein a switching operation of said energy-scavenging system causes a plurality of pulses within each of the first polarity waveform portion and the second polarity waveform portion; and
a processing device powered from said power supply voltage and having a sensor input coupled to receive the electrical transduction signal, said processing device configured to:
count the pulses within the first polarity waveform portion;
count the pulse within the second polarilty waveform portion; and
determine that a step has occurred if a number of counted pulses within the first polarity waveform portion exceeds a first threshold and a number of counted pulses in the second polarity waveform portion exceeds a second threshold.

17. The device of claim 16, said processing device further configured to increment a step counter in response to determination that said step has occurred.

* * * * *